Patented Sept. 9, 1952

2,610,173

UNITED STATES PATENT OFFICE 2,610,173

COPOLYMERIZING ACRYLONITRILE AND VINYLIDENE CHLORIDE AT CONSTANT REFLUX TEMPERATURE

George E. Ham, Dayton, Ohio, assignor to Monsanto Chemical Company, St. Louis, Mo., a corporation of Delaware No Drawing. Application August 31, 1948, Serial No. 47,157

6 Claims. (Cl. 260—85.5)

This invention relates to a new copolymer having chemical and physical properties which adapt it to fabrication of synthetic fibers. More particularly this invention relates to copolymers of acrylonitrile and vinylidene chloride having uniform chemical and physical structure which can be dissolved to form extrudable solutions suitable for fiber production.

Copolymers of vinylidene chloride and large proportions of acrylonitrile have been prepared before, but the methods of preparing them described in published literature are not useful for the preparation of fiber forming copolymers. The acrylonitrile and vinylidene chloride have quite different characteristics of polymerization, and, when the monomers are mixed prior to polymerization, the copolymers formed will have compositions quite different from the composition of the mixed monomers. Thus, the first increment of copolymer formed will have compositions quite different from the composition of the mixed monomers. Thus, the first increment of copolymer formed will be relatively richer in acrylonitrile, whereas, the last increment of polymer formed will be comprised almost entirely of vinylidene chloride. The first and last increments of polymer, in addition to being quite different chemically, will have very different molecular weights, solubilities and other properties characteristic of the different monomers of which they are constituted. Accordingly, the vinylidene chloride-acrylonitrile copolymers of the prior art, which are sufficiently high in acrylonitrile to be insoluble in common organic solvents and have the requisite tenacity for synthetic fibers, are not soluble in acrylonitrile copolymer solvents, such as dimethyl formamide; and therefore cannot be fabricated into fibers by customary spinning procedures.

The fundamental purpose of this invention is to provide a new copolymer of vinylidene chloride and acrylonitrile which is soluble in fiber spinning solvents, such as dimethyl formamide. A further purpose of this invention is to provide a new method for preparing copolymers of vinylidene chloride and acrylonitrile of unusually uniform physical and chemical composition. A still further purpose of this invention is to provide fibers of novel and useful chemical composition and physical properties.

In accordance with this invention, it has been found that vinylidene chloride and acrylonitrile, when polymerized by the method hereinafter described, will have quite different physical properties than when prepared by the methods heretofore used and described in the published literature. Copolymers of 80 to 98 percent acrylonitrile and 2 to 20 percent of vinylidene chloride prepared by the batch techniques of the prior art are insoluble in dimethyl formamide and any of the other conventional acrylonitrile polymer solvents. The same copolymer, however, when prepared by the mixed monomer addition technique, hereinafter described, are readily soluble in dimethyl formamide, and the solutions so prepared are capable of extrusion to form, after the elimination of the solvent, fibers of high tensile strength, low boil shrinkage, and desirable elasticity. The new copolymers of acrylonitrile and vinylidene chloride may in addition contain up to 15 percent of other monomeric components copolymerized therewith, for example, vinyl acetate.

The practice of this invention utilizes an emulsion polymerization which is conducted at a constant reflux temperature. This desired condition is maintained by mixing the monomers under conditions such that polymerization does not proceed and introducing them into a reaction zone where the conditions are such as to permit polymerization. By regulating the rate of introduction of the mixed monomers so as to maintain at all times a constant, or substantially constant, reflux temperature, the production of superior copolymers is achieved. If the reflux temperature increases, the rate of addition should be increased; and if the reflux temperature drops, indicating that the proportion of unreacted monomer in the reaction mass has increased, the rate of addition should be reduced. "Substantially constant reflux temperature" means a temperature which does not vary more than two degrees centigrade in either direction; "substantially 70° C." meaning not more than 71° C. and not less than 69° C. The maintenance of such temperatures assures the continued presence of a constant ratio of water to monomer in the reaction mass and prevents the accumulation of the unreacted monomers. Other variables affecting the rate of polymerization and the physical and chemical characteristics of the copolymers are more easily controlled, conventional practices being used.

The polymerization is catalyzed by means of any water soluble peroxy compound, for example, sodium peroxide, hydrogen peroxide, sodium perborate, the sodium salts of other peroxy acids, the potassium, ammonium and other water soluble salts of the above or other peroxy acids, and any other water soluble compound containing a peroxy radical (—O—O—). A wide variation in the quantity of the peroxy catalyst is possible, For example, from 0.001 to 1.0 percent of the polymerizable monomer may be used. The catalyst may be charged at the outset of the reaction, or it may be added, either continuously or in increments, throughout the polymerization reaction. The latter method is preferred because it enables the maintenance of a more nearly uniform concentration of catalyst in the reaction mass, thereby producing a copolymer of more nearly the ideal chemical and physical properties.

Although the uniform distribution of the reagents throughout the reaction mass can be achieved by vigorous agitaton, it is generally desirable to promote the uniform distribution of reagents through the use of wetting agents, or emulsion stabilizers. Suitable agents for this purpose are the water soluble salts of fatty acids, such as sodium oleate and potassium stearate, mixtures of water soluble fatty acid salts, such as the common soaps prepared by the saponification of animal and vegetable oils, the "amino soaps," such as triethanol amine and dodecyl methyl amine, the rosin soaps, such as alkali metal salts of rosin acids and mixtures thereof; the water soluble salts of half esters of sulfuric acid and long chain alkyl alcohols, such as sodium lauryl sulfate, sulfonated hydrocarbons, such as alkyl aryl sulfonate and any other of the wide variety of wetting agents, which are in general organic compounds containing both hydrophobic and hydrophilic radicals. The quantity of emulsifying agents will depend upon the particular agents selected, the ratio of water and monomers to be used, and the other conditions of polymerization. In general, however, from 0.1 to 5 percent by weight of the monomer may be employed.

The temperature of polymerization is always the reflux temperature of the reaction mass, the actual temperature utilized may be varied by modifying the polymerization conditions, temperatures almost as high as the boiling point of water and almost as low as the boiling point of the more volatile monomer acrylonitrile being feasible. In general, temperatures from 60 to 85° C. may be employed, but preferred operations utilize temperatures between 68 and 75° C. The exact temperature of polymerization will depend upon the ratio of water to monomer in the reaction mass, the nature and concentration of the catalyst employed and the quantity and type of emulsifying agent.

The reagents may be combined by a wide variety of methods. In general, the monomers are mixed separately and charged gradually to the reaction vessel containing water and all of the other essential ingredients, which are maintained at temperatures approximately that of the ultimate reflux. If desired, the monomers may each be added in a separate stream, but it is more practicable to add a single stream of premixed monomers. In order to avoid unduly high concentrations of catalyst and emulsifier in the reaction mass at the beginning of the reaction, most of the emulsifier in the reaction may be mixed with the monomer and added simultaneously therewith to the reaction vessel. Preferably only a small portion of the catalyst is charged at the beginning of the reaction, and the remainder added, either continuously or intermittently, throughout the course of the reaction. The preferred manner of operation involves heating a body of water containing a small amount of catalyst and emulsifier to approximately the ultimate reflux temperature of the reaction, and thereafter gradually adding the mixed monomer in the proportions desired in the ultimate copolymer.

The emulsion polymerizations are preferably conducted in glass or glass-line vessels which are provided with a means for agitating the contents thereof. Generally rotary stirring devices are the most effective means of assuring the intimate contact of the reagents, but other methods may successfully be employed, for example, by rocking or tumbling the reactors. The polymerization equipment usually used is conventional in the art, and any kind of apparatus which provides means for gradually adding monomers to a polymerization reaction may be used. It is essential that the monomers be charged at a rate such that a reflux at a constant temperature is maintained. Obviously, a wide variety of automatic temperature controls may be used to assure the desired conditions. The ideal conditions are achieved by utilizing automatic valves on the monomer supply which are thermostatically regulated so as to provide at all times a reaction mass having a constant boiling point. These ideal conditions may be approximated by a mechanism which adds an increment of monomer mixture every time the temperature reaches a predetermined maximum.

The method may be operated by withdrawing a continuous stream of the emulsion for further processing, and it may be operated semi-continuously by the gradual addition of a previously prepared mixture of monomers while allowing all of the reaction mass to remain in the reaction vessel until the reaction is complete. Because of its adaptability to industrial operations, the latter method is most generally employed. It will be apparent that in the practice of this semi-continuous method, it is not possible to maintain a constant reflux temperature after all of the prepared charge of mixed monomer has been added. Accordingly, further polymerization is avoided by interrupting the reaction. This may be done by destroying one or more of the essential conditions of polymerization, for example, by reducing the temperature, by adding polymerization inhibitor, by rapidly steam distilling the mass to eliminate unreacted monomers, or by the addition of a nonsolvent, such as ethanol.

Another expedient for more nearly attaining ideal operating conditions is to minimize the variation from the desired chemical composition encountered at the outset of polymerization. Any selected ratio of monomers will copolymerize to form a copolymer of definite proportions which are different from the monomer-ratio selected. In order to assure that every polymer increment has the identical chemical composition, it may be desirable to charge the reactor initially with a proportion of monomers different from the ratio of components desired in the copolymer, but so selected that the first increment of polymer has the said desired ratio of components. As soon as the polymerization begins, the monomers in the proportion desired in the ultimate polymer are charged in accordance with the method of this invention. Such procedure will produce an optimum product, but excellent approximations of the ideal conditions may be achieved by heating a body of water containing catalyst and emulsifying agent to approximately the ultimate reflux temperature, and then adding thereto the monomers of proportions desired in the ultimate copolymer at a rate such that a constant reflux temperature is maintained.

The method of this invention may be used to prepare a copolymer of very much more uniform chemical and physical properties than can be achieved by any method heretofore used. In accordance with this method, copolymers of 80 to 98 percent of acrylonitrile, 2 to 20 percent of vinylidene chloride, and up to 15 percent of other monomers compatible therewith, for example vinyl acetate, may be prepared. The compositions being readily soluble in dimethyl formamide and other conventional acrylonitrile solvents are capable of being fabricated into fibers of unusual quality. The fiber preparation may involve either the wet or dry spinning techniques. The former of these involves the extrusion of the copolymer solution into a liquid bath which extracts the solvent and precipitates the copolymer in a continuous form. The dry spinning technique, on the other hand, involves extruding the solution into a gaseous medium maintaining at a temperature sufficient to evaporate the solvent and thereby precipitating the copolymer. Either of these methods may be used to prepare fibers of the new copolymer.

Further details of the preparation of copolymers, fiber spinning solutions, and high tenacity fibers are set forth with respect to the following specific examples.

Example I

A 3-liter reaction vessel provided with a water cooled reflux condenser, a dropping funnel, and a rotary stirrer, was charged with 1000 grams of distilled water, 0.2 gram of potassium persulfate, and 1 gram of the di-2-ethylhexyl ester of sodium sulfosuccinic acid. The vessel and its contents were heated to 70° C., and a mixture of 190 grams of acrylonitrile and 10 grams of vinylidene chloride added dropwise at a rate which maintained the temperature at 70° C. $\mp 1°$ C. The addition of all of the mixed monomers required four hours, after which the unreacted monomers were rapidly removed by steam distillation. The copolymer was removed from the reaction mass by direct drying.

The copolymer so prepared was readily soluble in dimethylformamide, from which solution it was extruded through a spinnerette into water and a continuous fiber so prepared. After stretching the fiber 500 percent, it was found to have a tenacity of 2.75 grams per denier.

Example II

Using the procedure described in the preceeding example, a copolymer was prepared from 80 percent by weight acrylonitrile, 10 percent of vinylidene chloride and 10 percent vinyl acetate. Fibers prepared by extrusion from a dimethylformamide solution were found to have strengths of 3.8 to 4.4 grams per denier.

Example III

Using the procedure described in Example I, a copolymer was prepared from 84 percent by weight of acrylonitrile, 11 percent of vinylidene chloride and 5 percent of vinyl acetate. The copolymer was readily soluble in dimethyl formamide and fibers prepared by extrusion through spinnerettes were found to have a fiber strength of 3.5 grams per denier.

The invention is defined by the following claims.

1. A method of preparing copolymers of 80 to 98 per cent of acrylonitrile and from two to 20 per cent of vinylidene chloride which comprises adding the monomers in fixed relative proportions to an aqueous medium in the presence of a water-soluble peroxy compound and a wetting agent at the reflux temperature of the aqueous medium, said addition being made continuously at a varying rate such that the reflux temperature remains constant, and removing the polymerized product from the reaction medium after the polymerization reaction has ended.

2. A method of preparing copolymers of 80 to 98 per cent of acrylonitrile and from two to 20 per cent of vinylidene chloride which comprises adding the monomers in fixed relative proportions to an aqueous medium in the presence of a water-soluble peroxy compound and a wetting agent at the reflux temperature of the aqueous medium, said addition being made continuously at a varying rate such that the reflux temperature remains constant, interrupting the polymerization as soon as a predetermined quantity of monomers has been added, and recovering the copolymer from the reaction medium after the polymerization reaction has ended.

3. A method of preparing copolymers of 80 to 98 per cent of acrylonitrile and from two to 20 per cent of vinylidene chloride which comprises adding a pre-determined mixture of acrylonitrile and vinylidene chloride in fixed relative proportions to an aqueous medium containing a water-soluble peroxy compound and a wetting agent, said addition being made at reflux temperature and at a varying rate such that the reflux temperature is substantially constant, and removing the polymerized product from the reaction medium after the polymerization reaction has ended.

4. A method of preparing copolymers of 80 to 98 per cent of acrylonitrile and from two to 20 per cent of vinylidene chloride which comprises adding a pre-determined mixture of acrylonitrile and vinylidene chloride in fixed relative proportions to an aqueous medium containing a water-soluble peroxy compound and a wetting agent, said addition being made at reflux temperature and at a varying rate such that the reflux temperature is substantially constant, interrupting the polymerization as soon as a pre-determined quantity of monomers has been added, and recovering the copolymer from the reaction medium after the polymerization reaction has ended.

5. A method of preparing uniform copolymers of 80 to 98 per cent of acrylonitrile and from two to 20 per cent of vinylidene chloride which comprises initially charging to an aqueous medium in the presence of a water-soluble peroxy compound and a wetting agent, acrylonitrile and vinylidene chloride in proportions such that the initial copolymers increment is of a pre-determined proportion, then charging acrylonitrile and vinylidene chloride continuously in the said pre-determined proportion at a varying rate such that the reflux temperature remains constant, and removing the polymerized product from the reaction medium after the polymerization reaction has ended.

6. A method of preparing uniform copolymers of 80 to 98 per cent of acrylonitrile and from two to 20 per cent of vinylidene chloride which comprises initially charging to an aqueous medium in the presence of a water-soluble peroxy compound and a wetting agent, acrylonitrile and vinylidene chloride in proportions such that the initial copolymers increment is of a pre-determined proportion; then charging acrylonitrile and vinylidene chloride continuously in the said pre-determined proportion at a varying rate such that the reflux temperature remains constant, interrupting the polymerization as soon as a pre-determined quantity of monomers has been added, and recovering the copolymer from the reaction medium after the polymerization reaction has ended.

GEORGE E. HAM.

REFERENCES CITED

The following references are of record in the file of this patent:

UNITED STATES PATENTS

| Number | Name | Date |
|---|---|---|
| 2,238,020 | Hanson et al. | Apr. 8, 1941 |
| 2,278,415 | Arnold | Apr. 7, 1942 |
| 2,404,779 | Arnold | July 30, 1946 |
| 2,436,926 | Jacobson | Mar. 2, 1948 |
| 2,456,360 | Arnold | Dec. 14, 1948 |
| 2,486,241 | Arnold | Oct. 25, 1949 |
| 2,496,267 | Chaney | Feb. 7, 1950 |
| 2,496,384 | De Nie | Feb. 7, 1950 |